(12) United States Patent
Li et al.

(10) Patent No.: US 10,366,137 B2
(45) Date of Patent: Jul. 30, 2019

(54) METHODS AND APPARATUS FOR CONTENT DELIVERY VIA BROWSER CACHE EXTENSION

(71) Applicant: INTERDIGITAL PATENT HOLDINGS, INC., Wilmington, DE (US)

(72) Inventors: Jun Li, Cranbury, NJ (US); Debashish Purkayastha, Collegeville, PA (US); Alexander Reznik, Pennington, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 215 days.

(21) Appl. No.: 15/503,935

(22) PCT Filed: Aug. 5, 2015

(86) PCT No.: PCT/US2015/043849
§ 371 (c)(1),
(2) Date: Feb. 14, 2017

(87) PCT Pub. No.: WO2016/025267
PCT Pub. Date: Feb. 18, 2016

(65) Prior Publication Data
US 2017/0277805 A1 Sep. 28, 2017

Related U.S. Application Data

(60) Provisional application No. 62/037,634, filed on Aug. 15, 2014.

(51) Int. Cl.
*G06F 16/00* (2019.01)
*G06F 16/957* (2019.01)
(Continued)

(52) U.S. Cl.
CPC ...... *G06F 16/9574* (2019.01); *G06F 12/0615* (2013.01); *G06F 16/183* (2019.01)

(58) Field of Classification Search
CPC .......... G06F 17/30902; G06F 12/0615; G06F 17/30203; G06F 17/30094;
(Continued)

(56) References Cited

U.S. PATENT DOCUMENTS 5,925,126 A * 7/1999 Hsieh ................. G06F 21/6281
726/19
6,026,474 A 2/2000 Carter et al.
(Continued)

FOREIGN PATENT DOCUMENTS

WO 16/025827 2/2016

OTHER PUBLICATIONS

Stanski et al., Document Archiving, Replication and Migration Container for Mobile Web Users, 5 pages (Year: 1998).*
(Continued)

*Primary Examiner* — Noosha Arjomandi
(74) *Attorney, Agent, or Firm* — Volpe and Koenig, P.C.

(57) ABSTRACT

Embodiments include methods, systems, and apparatuses for content delivery using shared caching, and more specifically, a browser cache extension (BCE) between a local browser cache and a remote cache located on an edge server. In an embodiment, a remote BCE function on the edge server may create a shared cache folder containing a remote cache and an remote cache index file. A local BCE function in the local browser may be able to access the shared cache folder via a network file system (NFS) protocol. The local BCE function may merge the remote index file with a local index file from the local browser and retrieve the remote cache at the local browser.

14 Claims, 10 Drawing Sheets

(51) Int. Cl.
*G06F 16/182* (2019.01)
*G06F 12/06* (2006.01)
(58) Field of Classification Search
CPC .......... G06F 17/30194; G06F 16/9574; G06F 16/183; G06F 16/182; G06F 16/134
See application file for complete search history.

(56) References Cited

U.S. PATENT DOCUMENTS

| | | | |
|---|---|---|---|
| 6,192,398 B1 | 2/2001 | Hunt | |
| 6,253,234 B1* | 6/2001 | Hunt | G06F 17/30902 707/999.01 |
| 7,117,504 B2* | 10/2006 | Smith | G06F 8/20 719/328 |
| 7,428,540 B1 | 9/2008 | Coates et al. | |
| 7,904,447 B1 | 3/2011 | Russell et al. | |
| 8,812,651 B1 | 8/2014 | Eriksen et al. | |
| 9,271,123 B2* | 2/2016 | Medard | H04W 4/06 |
| 9,722,851 B1* | 8/2017 | Hill | H04L 29/08072 |
| 2002/0065938 A1* | 5/2002 | Jungck | H04L 47/10 709/246 |
| 2004/0139125 A1* | 7/2004 | Strassburg | G06F 11/2064 |
| 2005/0149528 A1 | 7/2005 | Anderson et al. | |
| 2006/0026154 A1* | 2/2006 | Altinel | G06F 17/3048 |
| 2006/0136487 A1* | 6/2006 | Kim | H04L 67/06 |
| 2006/0143239 A1* | 6/2006 | Battat | G06F 17/30371 |
| 2007/0220000 A1* | 9/2007 | Walsh | G06F 12/0842 |
| 2010/0070448 A1* | 3/2010 | Omoigui | H01L 27/1463 706/47 |
| 2010/0115613 A1* | 5/2010 | Ramaswami | G06F 17/30902 726/22 |
| 2011/0138467 A1* | 6/2011 | Macwan | G06F 21/554 726/24 |
| 2014/0006465 A1* | 1/2014 | Davis | G06F 17/30194 707/827 |
| 2014/0012937 A1* | 1/2014 | Thomson | G06Q 30/0269 709/213 |
| 2014/0244429 A1* | 8/2014 | Clayton | G06Q 30/0631 705/26.7 |
| 2014/0269269 A1* | 9/2014 | Kovvali | H04W 24/08 370/229 |
| 2015/0381756 A1 | 12/2015 | Lotfallah et al. | |
| 2016/0321291 A1* | 11/2016 | Malhotra | G06F 17/30233 |
| 2017/0013073 A1* | 1/2017 | Mendez | H04L 67/22 |
| 2017/0255525 A1* | 9/2017 | Dain | G06F 11/1453 |

OTHER PUBLICATIONS

Akamai Technologies, Inc., "Secure Content Delivery Network," available at https://www.akamai.com/us/en/multimedia/documents/akamai/akamai-secure-content-delivery-network-cdn.pdf (Feb. 18, 2014).
Amazon, "Amazon CloudFront Custom SSL," available at http://web.archive.org/web/20140812050650/http://aws.amazon.com/cloudfront/custom-ssl-domains/ (Aug. 12, 2014).
Andrews, "Always-On, SSL, Part I," available at http://web.archive.org/web/20160414151302/https://casecurity.org/2014/01/16/always-on-ssl-part-i/ (Jan. 16, 2014).
Barth et al., "The Security Architecture of the Chromium Browser," pp. 1-10 (2008) available at https://seclab.stanford.edu/websec/chromium/chromium-security-architecture.pdf.
Electronic Frontier Foundation, "HTTPS Everywhere," available at https://web.archive.org/web/20140814012943/https://www.eff.org/https-everywhere (Aug. 14, 2014).
Farrell et al., "An Internet Attribute Certificate Profile for Authorization," Network Working Group, RFC 3281 (Apr. 2002).
Jacobson et al., "Networking Named Content," CoNEXT 2009, ACM (Dec. 1-4, 2009).
Mitmproxy, "How mitmproxy works," available at http://web.archive.org/web/20140731142829/http://mitmproxy.org/doc/howmitmproxy.html (Jul. 31, 2014).
Mobilityfirst, "MobilityFirst Future Internet Architecture Project Overview," available at http://web.archive.org/web/20140809210314/http://mobilityfirst.winlab.rutgers.edu/ (Aug. 9, 2014).
Nakamura et al., "Trends in Small Cell Enhancements in LTE Advanced," LTE Technology Update: Part 2, IEEE Communications Magazine (Feb. 2013).
Nirsoft, "ChromeCacheView v1.56—Cache viewer for Google Chrome Web browser" available at http://web.archive.org/web/20140812060031/http://nirsoft.net/utils/chrome_cache_view.html (Aug. 12, 2014).
Qian et al., "Web Caching on Smartphones: Ideal vs. Reality," Proceedings of the 10th International Conference on Mobile Systems, Applications, and Services, pp. 127-140 (Jun. 2012).
Telecommunication Standardization Sector of ITU, "ITU-T, Series X: Data Networks, Open System Communications and Security, Information technology—Open Systems Interconnection—The Directory: Public-key and attribute certificate frameworks," X.509 (Aug. 2005).
The Chromium Projects, "Disk Cache," available at http://www.chromium.org/developers/design-documents/network-stack/disk-cache (Jul. 12, 2014).
The Chromium Projects, "Very Simple Backend," available at http://web.archive.org/web/20140526162954/http://www.chromium.org/developers/design-documents/network-stack/disk-cache/very-simple-backend (May 26, 2014).
Tollman, "Why we don't use a CDN: A story about SPDY and SSL," (Feb. 5, 2014) available at https://thethemefoundry.com/blog/why-we-dont-use-a-cdn-spdy-ssl/.
Trossen et al., "Designing and Realizing an Information-centric Internet," IEEE Communications Magazine, vol. 50, No. 7 (Jul. 2012).
Tuecke et al., "Internet X.509 Public Key Infrastructure (PKI)," Network Working Group, RFC 3820 (Jun. 2004).
W3C, "Cross-Origin Resource Sharing," available at http://web.archive.org/web/20140805202503/http://www.w3.org/TR/cors/ (Aug. 5, 2014).
Wang et al., "How Speedy is SPDY," Proceedings of the 11th USENIX Conference on Networked Systems Design and Implementation, pp. 387-399 (Apr. 2014).

* cited by examiner

```
RIF - Remote Index File (URL hash as keys of entries)
LIF - Local Index File (URL hash as keys of entries)
E – Entry in index file = {key, entryFile, timestamp}

Merge entries of RIF into LIF :
Read next entry E from RIF :
 if E.timestamp is newer than what in LIF {
    create symbolic link L -> sharedFolder/E.entryFile;
    let E.entryFile = L;
    overwrite E to LIF;
 else
    continue;
```

FIG. 6

METHODS AND APPARATUS FOR CONTENT DELIVERY VIA BROWSER CACHE EXTENSION

CROSS REFERENCE TO RELATED APPLICATIONS

This application is the U.S. National Stage, under 35 U.S.C. § 371, of International Application No. PCT/US2015/043849 filed Aug. 5, 2015, which claims the benefit of U.S. Provisional Application No. 62/037,634, filed on Aug. 15, 2014, the contents of which are hereby incorporated by reference herein.

BACKGROUND

Content distribution/delivery network (CDN) technology may use edge caching to offload network traffic at either content servers or internet service provider (ISP) networks. Edge servers may be located closer to content consumers than the content servers and ISP core networks. CDN technology may redirect hypertext transfer protocol (HTTP) content requests to edge servers of a CDN, which may intercept, inspect, and route content requests to either a cache or the original server. Path-oriented networks, such as information-centric networking (ICN) networks, may focus on the routing of information rather than merely sending bit packets from endpoint A to endpoint B as in Internet Protocol (IP) networking. In path-oriented networks, data may become independent from location, application, storage, and means of transportation, enabling in-network caching and replication.

SUMMARY

In an embodiment, a method of content delivery using a shared cache is disclosed. The method may include extending a local browser cache from a user device to a remote cache on an edge server of a content distribution/delivery network (CDN) and providing the local browser access to the remote cache.

In another embodiment, a method of content delivery using a browser cache extension (BCE) is disclosed. The method may include: creating a shared cache folder containing a remote cache from an edge server, wherein the shared cache folder is accessible to a local browser of a user device; creating a remote index file for the remote cache; merging the remote index file with a local index file from the local browser; and retrieving the remote cache at the local browser.

In another embodiment, a system for content delivery using a shared cache is disclosed. The system may include: an edge server that includes a remote BCE function, wherein the remote BCE function is configured to create a shared cache folder and prepare a remote cache; and a local browser that includes a local BCE function, wherein the local BCE function is configured to mount to the shared cache folder, merge a local cache index file with a remote cache index file of the remote cache, and retrieve the remote cache.

BRIEF DESCRIPTION OF THE DRAWINGS

A more detailed understanding may be had from the following description, given by way of example in conjunction with the accompanying drawings wherein:

FIG. 6 is a diagram illustrating the merging of index files;

DETAILED DESCRIPTION

Traditional hypertext transfer protocol (HTTP) proxy-based content distribution/delivery network (CDN) technology is designed to make content delivery transparent to a dominant Internet application/browser. In a small scale local network, deploying HTTP proxies may be a challenge to the CDN operator because configuring/maintaining the HTTP proxies in a uniform way may be difficult and costly at homes, hotspots (i.e., a heterogeneous network environment with low profile edge servers), or other small ad-hoc networks. In addition, an HTTP proxy-based CDN network may not work for an information-centric network (ICN) that does not use HTTP for hop-by-hop data transfer and hypertext transfer protocol secure (HTTPS) content that requires a content owner's certificate to set up a secure session.

A content sharing solution that remains transparent to Internet browsers, without requiring an HTTP proxy, may be desirable. Embodiments are described below with reference to FIGS. 1A-8 that may address this content sharing solution.

Figure 1A:
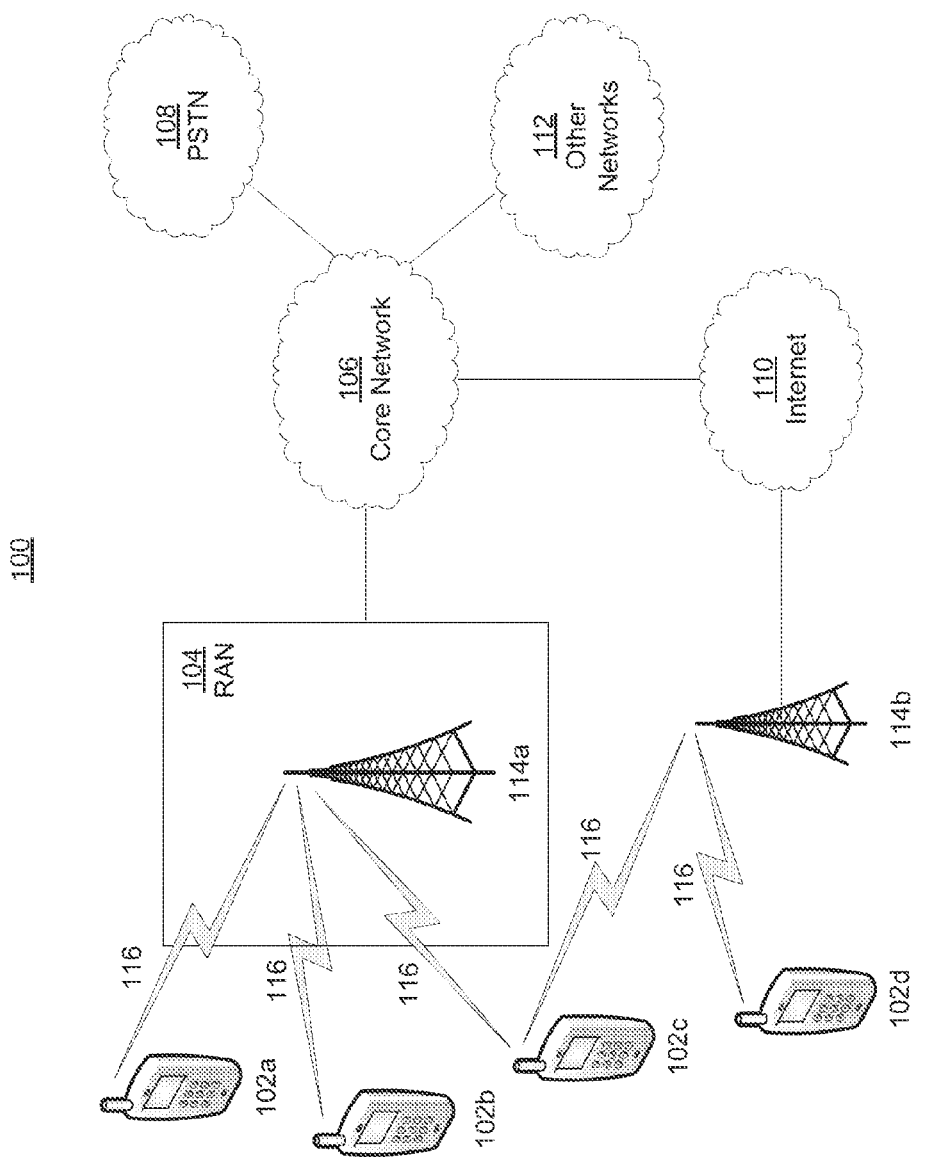
FIG. 1A is a system diagram of an example communications system in which one or more disclosed embodiments may be implemented.

Referring now to FIG. 1A, a diagram of an example communications system 100 in which one or more disclosed embodiments may be implemented is shown. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN)

108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
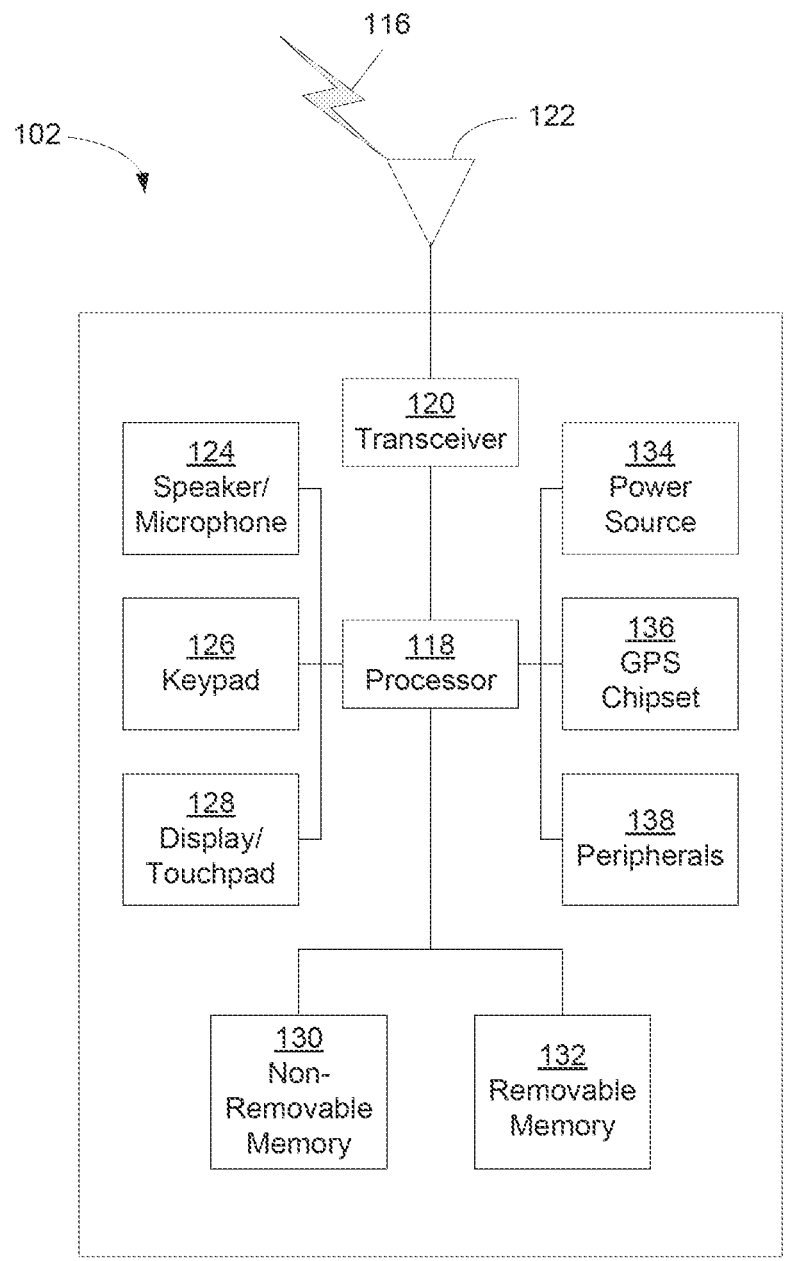
FIG. 1B is a system diagram of an example wireless transmit/receive unit (WTRU) that may be used within the communications system illustrated in FIG. 1A.

Referring now to FIG. 1B, a system diagram of an example WTRU 102 is shown. The WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
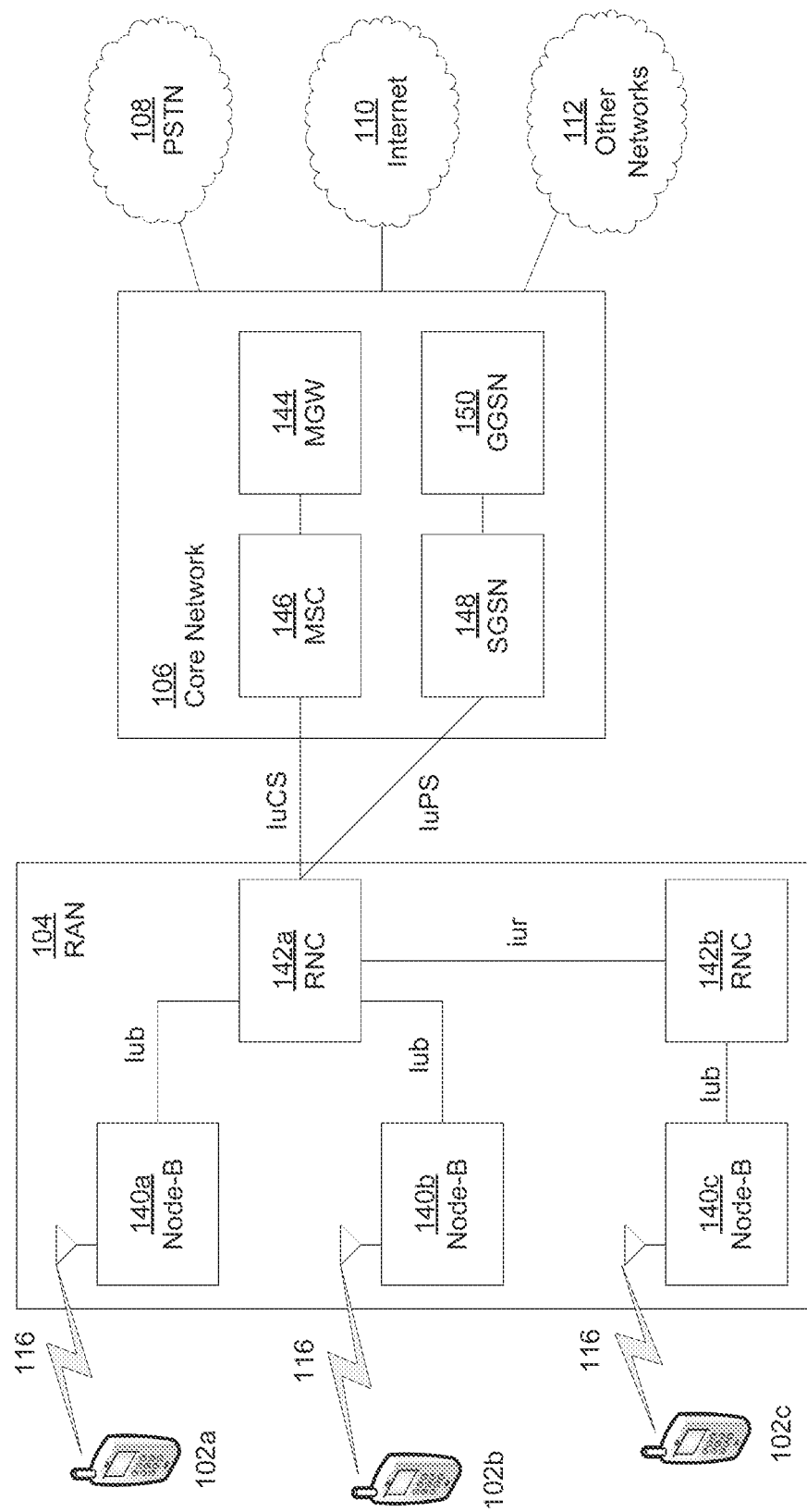
FIG. 1C is a system diagram of an example radio access network and an example core network that may be used within the communications system illustrated in FIG. 1A.

Referring now to FIG. 1C, a system diagram of the RAN 104 and the core network 106 according to an embodiment is shown. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1D:
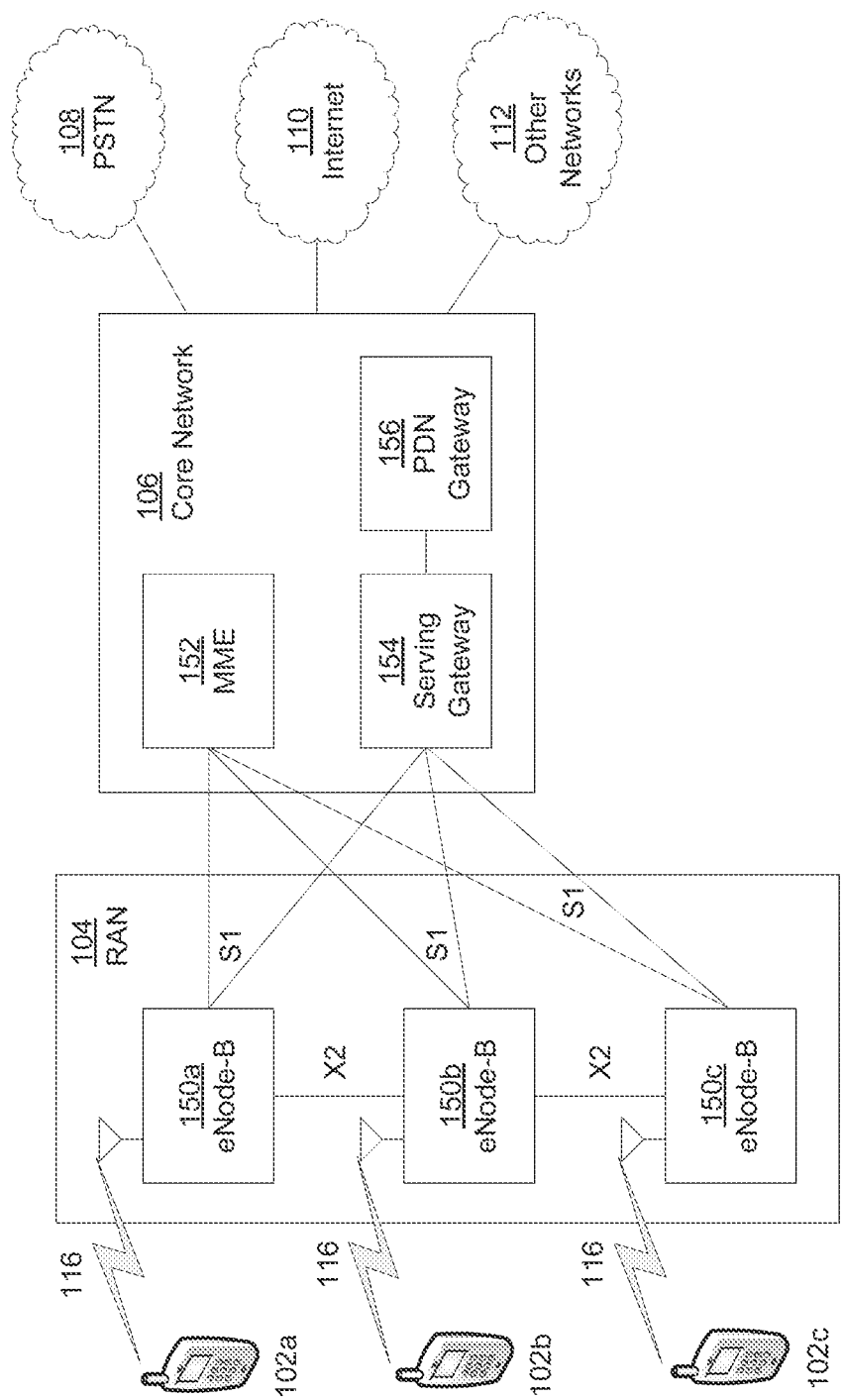
FIG. 1D is a system diagram of another example radio access network and another example core network that may be used within the communications system illustrated in FIG. 1A.

Referring now to FIG. 1D, a system diagram of the RAN 104 and the core network 106 according to another embodiment is shown. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1D, the RAN 104 may include base stations 150a, 150b, 150c, and an ASN gateway 152, though it will be appreciated that the RAN 104 may include any number of base stations and ASN gateways while remaining consistent with an embodiment. The base stations 150a, 150b, 150c may each be associated with a particular cell (not shown) in the RAN 104 and may each include one or more transceivers for communicating with the WTRUs 102a, 102b, 102c over the air interface 116. In one embodiment, the base stations 150a, 150b, 150c may implement MIMO technology. Thus, the base station 150a, for example, may use multiple antennas to transmit wireless signals to, and receive wireless signals from, the WTRU 102a. The base stations 150a, 150b, 150c may also provide mobility management functions, such as handoff triggering, tunnel establishment, radio resource management, traffic classification, quality of service (QoS) policy enforcement, and the like. The ASN gateway 152 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 150a, 150b, 150c may be defined as an R8 reference point that includes protocols for facilitating WTRU handovers and the transfer of data between base stations. The communication link between the base stations 150a, 150b, 150c and the ASN gateway 152 may be defined as an R6 reference point. The R6 reference point may include protocols for facilitating mobility management based on mobility events associated with each of the WTRUs 102a, 102b, 102c.

As shown in FIG. 1D, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 154, an authentication, authorization, accounting (AAA) server 156, and a gateway 158. While each of the foregoing elements are depicted as part of the core network 106, it will be appreciated that any one of these elements may be owned and/or operated by an entity other than the core network operator.

The MIP-HA 154 may be responsible for IP address management, and may enable the WTRUs 102a, 102b, 102c to roam between different ASNs and/or different core networks. The MIP-HA 154 may provide the WTRUs 102a, 102b, 102c with access to packet-switched networks, such as the Internet 110, to facilitate communications between the WTRUs 102a, 102b, 102c and IP-enabled devices. The AAA server 156 may be responsible for user authentication and for supporting user services. The gateway 158 may facilitate interworking with other networks. For example, the gateway 158 may provide the WTRUs 102a, 102b, 102c with access to circuit-switched networks, such as the PSTN 108, to facilitate communications between the WTRUs 102a, 102b, 102c and traditional land-line communications devices. In addition, the gateway 158 may provide the WTRUs 102a, 102b, 102c with access to the networks 112, which may include other wired or wireless networks that are owned and/or operated by other service providers.

Although not shown in FIG. 1D, it will be appreciated that the RAN 104 may be connected to other ASNs and the core network 106 may be connected to other core networks. The communication link between the RAN 104 and the other ASNs may be defined as an R4 reference point, which may include protocols for coordinating the mobility of the WTRUs 102*a*, 102*b*, 102*c* between the RAN 104 and the other ASNs. The communication link between the core network 106 and the other core networks may be defined as an R5 reference, which may include protocols for facilitating interworking between home core networks and visited core networks.

Embodiments described herein include a browser cache extension (BCE), which may implement primitive functions on both a browser (local) side and shared storage (remote) side of a network. A key challenge to this may be to maintain the browser security architecture and not increase the risk to web applications and/or local resources due to adding the browser cache extension.

Embodiments of the BCE method may be used for content sharing in a network by clients using browsers. The method may include a remote BCE function at an edge server of a network and a local BCE function in a browser. The remote function may download content into the cache in the edge server and create a remote index file for cached content. The local function may integrate the remote index file into the local index of the browser cache. Each entry of the content on the network cache may contain an entry file name pointing to the file over the network file system. When a request that matches the content on the network cache is received, the browser may retrieve the content using a network file system protocol, for example, NFS.

Content integrity assurance may be achieved through a trust relationship built between the local and remote BCE functions. If content is not signed by the content owner, the trust can be built at edge server level or mobile-CDN level.

In addition, the local BCE function may need to follow a browser's security architecture such that it does not increase the security risk of the browser due to the extension. In an embodiment, the local function may be implemented inside the browser kernel as an extension of the existing browser cache function. The browser's security measurement may remain unchanged such that cached content may be accessed through the browser kernel and may not be altered during and/or after being cached.

The embodiments described herein may be used for both HTTP and HTTPS content edge caching. A proxy-less edge caching architecture may be implemented with BCE, which may reduce the delay and complexity at the base stations 114*a*, 114*b*.

The BCE method may address the interface between legacy devices and a CDN without HTTP proxies, such as an ICN. For example, the browser may become the interface by which applications may gain access to content provided by the CDN/ICN network. Since the browser cache may already be a common resource that all web-applications are able to use (e.g., to make the content available to web-applications running on a device) the CDN/ICN network may only need to make it appear in the cache. This means that the details associated with where the content is stored, how it is fetched, etc., may now be completely hidden from the device. The browser cache may be a simple abstraction through which the CDN/ICN network and a legacy device interface and which the CDN/ICN network may use to completely hide the details of its operation from the legacy device.

An advantage of this may be the delivery of HTTPS content (i.e., content with HTTPS URL). A large, and ever-increasing, portion of publicly available content on the Internet uses HTTPS, which may make shareable content not cacheable. The embodiments described herein may make HTTPS content cacheable in proxy-less CDNs, including ICN networks.

Figure 2:
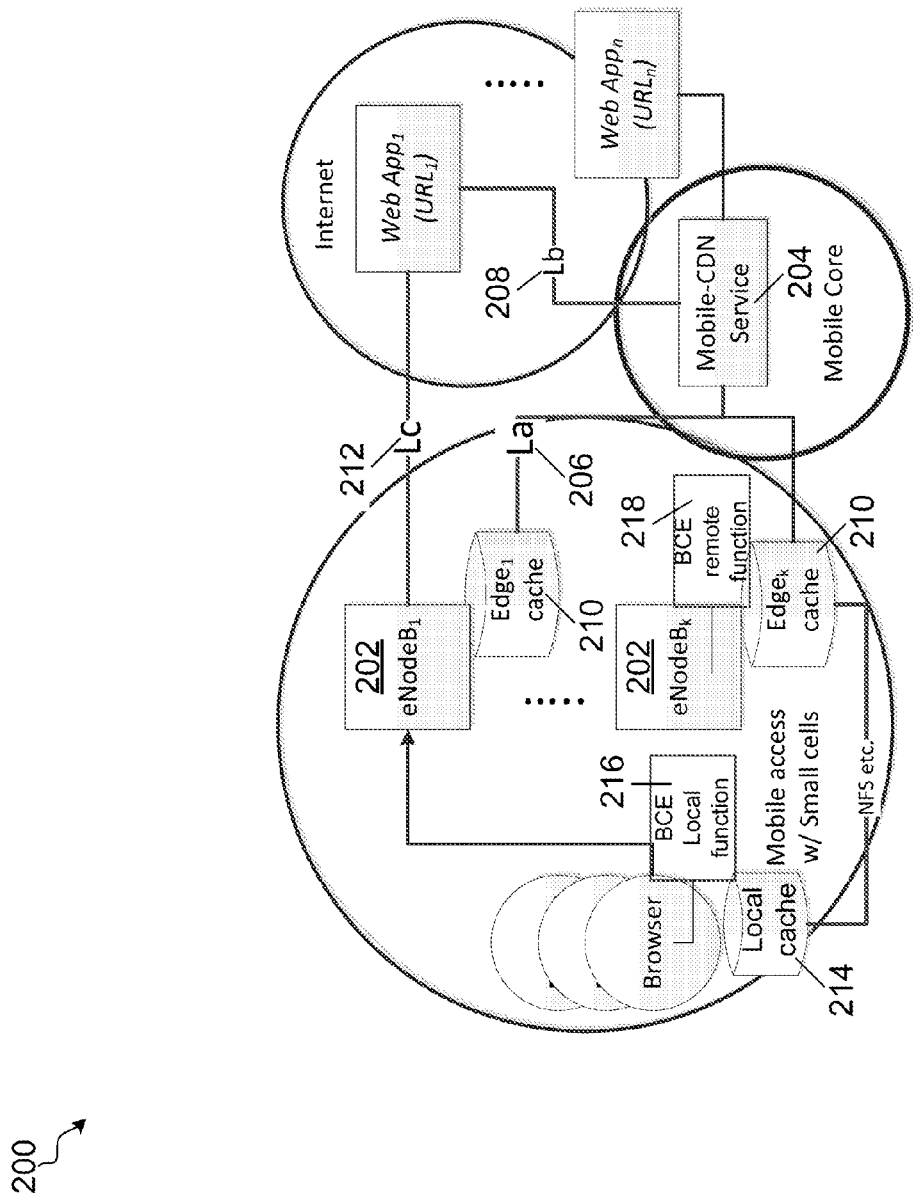
FIG. 2 is a diagram of a mobile-content distribution/delivery network (CDN) architecture.

Referring now to FIG. 2, a diagram of a mobile-CDN architecture 200 that may be used in embodiments is shown. The mobile-CDN architecture 200 may reduce backhaul pressure on small cell eNode-Bs 202 at peak hours, providing better quality of experience (QoE) to mobile users. In the example illustrated in FIG. 2, a mobile-CDN service 204 may have two interfaces, one to edge caches 210, shown as La 206, and the other to content owners, shown as Lb 208. The mobile-CDN service 204 may facilitate content distribution between content owners and edge caches 210 through interface Lc 212.

The mobile-CDN service 204 may have two primary functions. One function may be to recommend what to pre-fetch to edge caches 210 by matching user profiles with the content in the edge caches 210. Another function may be to obtain the authority to serve content at edge caches 210. The authority may be obtained from content owners through delegated certificates, and the authority may also be obtained from a client browser that agrees to treat the content in the edge cache 210 as part of a local cache 214.

In an embodiment, pre-fetched content in the edge cache 210 recommended by the mobile-CDN service 204 may be used as a part of a browser's local cache 214. Since a browser may access cached content using NFS protocols, the access may occur between a browser and an edge cache 210 without involving any additional rights delegation from content owners. In an embodiment, a local BCE function 216 may be included in the browser, and a remote BCE function 218 may be included at the edge server 210.

Figure 3:
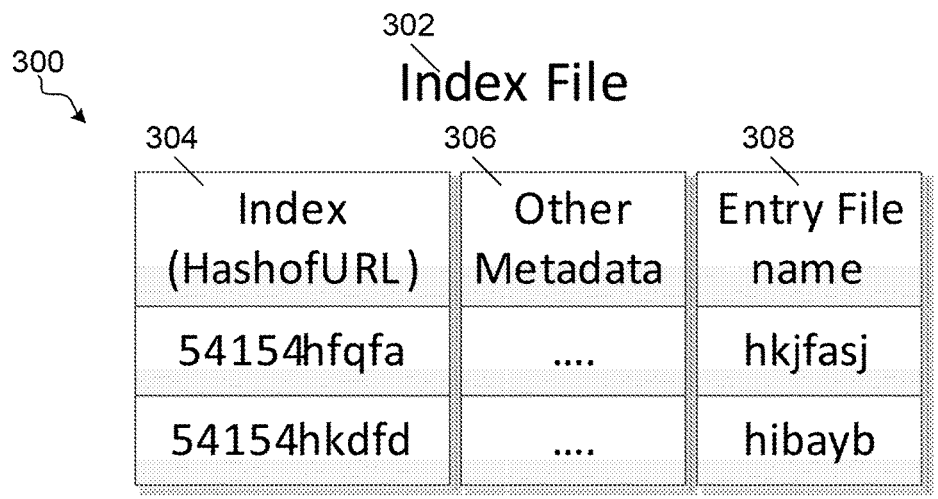
FIG. 3 is a an example of a file system and format for cached content that may be used in a local browser cache extension (BCE) function and a remote BCE function.
Figure 4:
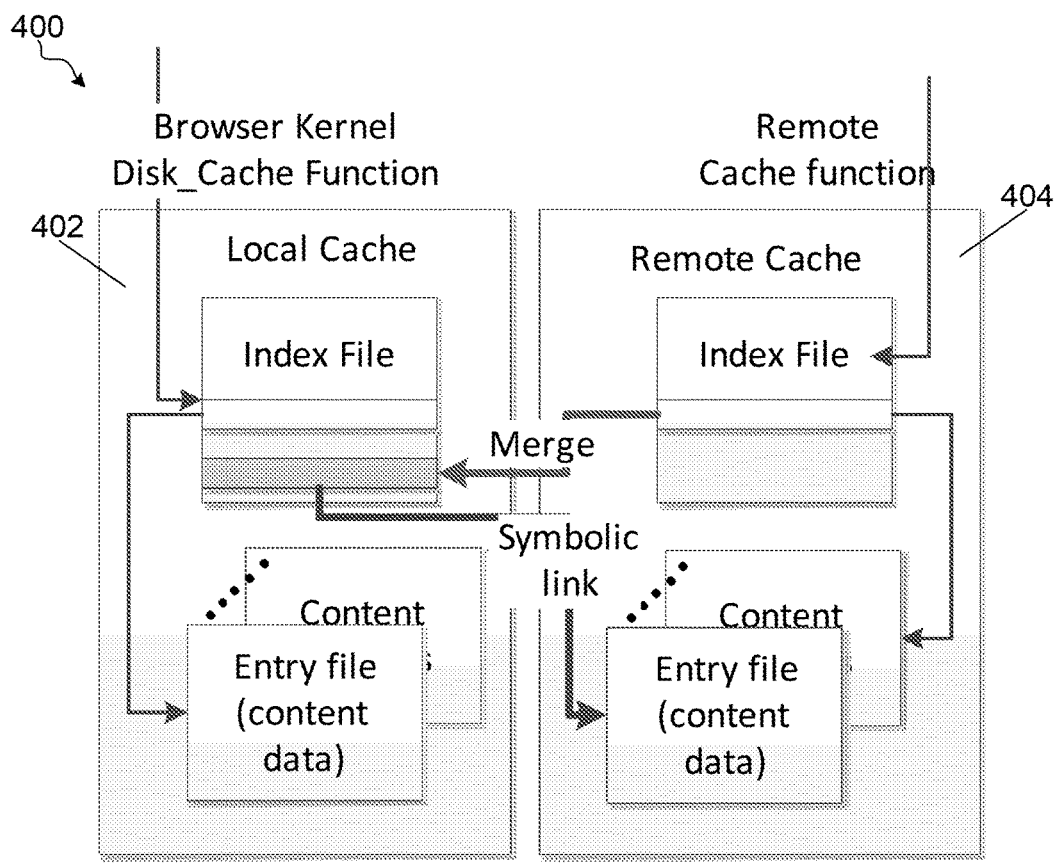
FIG. 4 is a diagram of a shared browser cache system integrating the local BCE function and the remote BCE function.

Referring now to FIG. 3 and FIG. 4, examples of a file system and format for cached content that may be used in the local BCE function 216 (FIG. 2) and the remote BCE function 218 (FIG. 2) are shown. Without loss of generality, this simple cache implementation is used as an example to illustrate the primitives of the local BCE function 216 and the remote BCE function 218.

A browser cache may be implemented with a browser cache system 300 including an index file 302, meta-data files 306, and data files 308. In an example browser cache system 300, the index file 302 may contain a hash table using the hash of content URLs 304 as keys to point to cache entries in the meta-data files 306, which may be block files with a fixed block size for easy addressing. Each cache entry may have a payload field 308 pointing to a single file of the content.

Different browsers may have different file system structures for their caches, but the principle may be the same: designing for fast insert, update and retrieval (e.g., much faster than a structured query language (SQL) database). The browser cache may be shared by applications within the same browser. Typically, if two applications use different browsers, it may normally not be possible to share common content through cache because they have different cache folders and one application may not trust another application's cache. Embodiments described herein may extend the browser cache function through the BCE so that content may be accessed, without trust issues, from a network shared folder.

The index file 302 may be a hash table from the name of the resource to the cache address that stores the resource. The hash of the name may allow a quick match of an entry. In an embodiment, the cache address may simply be a 32-bit number that describes exactly where the data is actually located. As shown in FIG. 3, for example, a cache entry has a cache address, and each element within the entry, such as HTTP header, payload, entry name and auxiliary information/ranking, may also have a cache address. From the index file 302, the browser may retrieve an entry 304, meta-data 306, and payload 308 using a two-step reference. An entry (i.e., cached resource) may be created or removed from the index file 302, and the associated data files may be created or removed accordingly. For an existing entry, the browser may read data or write data from or to the entry, respectively.

FIG. 4 is a diagram of a shared browser cache system 400 integrating the local BCE function 216 (FIG. 2) and the remote BCE function 218 (FIG. 2). In an embodiment, a local browser cache file system 402 may include all files in a single folder.

To extend the local browser cache 402 to a remote cache 404, located in a file at a remote server, the following primitive tasks may be performed: preparing a shared cache, preparing a cached content, mounting to the shared cache, merging index files, and cache retrieval.

With respect to the prepare a shared cache task, a remote server may export a folder from the remote cache 404 as a read-only shared folder over a network file system (e.g., NFS or any other network file system protocol) to the local browser cache 402.

With respect to preparing cached content, the remote server may pre-fetch content to the shared folder and create a remote index file with meta-data needed for the local browser cache 402.

With respect to the mount a shared cache task, the local browser cache 402 may mount the shared folder through a NFS protocol, as described above.

With respect to the merge index files task, the local browser cache 402 may read the remote index file from the shared cache. For each entry in the remote index file, the local browser cache 402 may create a symbolic link in the local cache folder to the remote entry file and add a link in the local index file.

With respect to the cache retrieval task, when the local browser makes an HTTP/HTTPS request, it may check the cache match through its cache function. If a match points to a symbolic link to the shared folder, the cache function may read the remote entry over a NFS protocol, as described above.

In an embodiment, the preparing the shared cache and the preparing the cached content may be performed by the remote BCE function 218. The mounting to the shared cache, merging index files, and cache retrieval may be performed by a local BCE function 216 in the browser.

Figure 5:
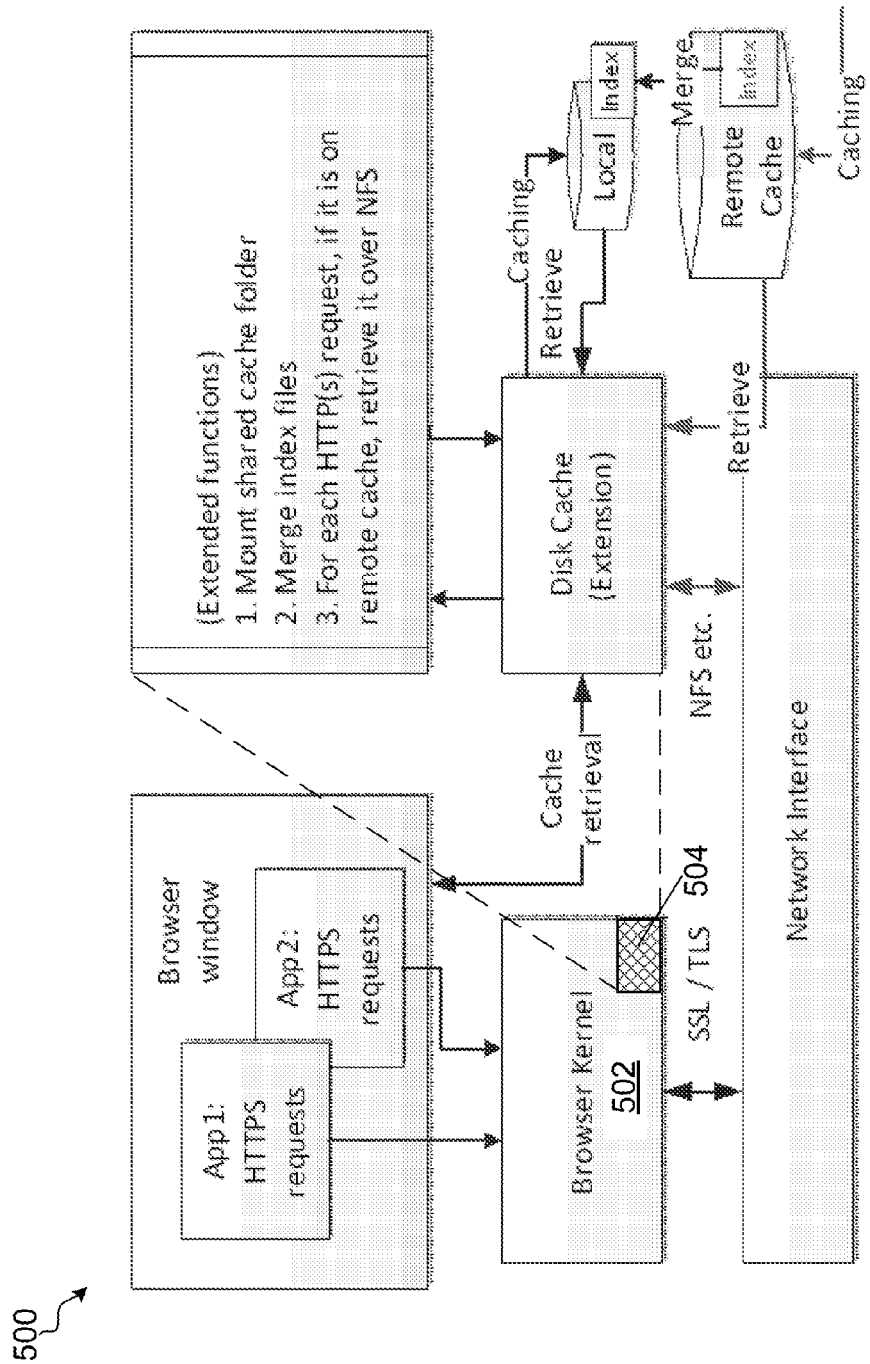
FIG. 5 is a diagram overview of a system employing the local BCE function and the remote BCE function.

Referring now to FIG. 5, an overview of a system 500 employing the local BCE function 216 (FIG. 2) and the remote BCE function 218 (FIG. 2) is shown. In an embodiment, a local cache 504 of a browser (including the local BCE function 216) may be implemented inside a browser kernel 502. In an embodiment, the browser cache function Disk_Cache may respond only to a browser kernel's requests. All web applications may access the cache only through the browser kernel. The browser kernel may guarantee that cached content is always from the original URLs, and no application can alter the content after it is stored.

In FIG. 5, the extended functions performed by the local BCE function 216 are listed for Disk_Cache to be implemented. In an embodiment, the extended functions may allow the browser to access content cached in both local and remote caches.

An edge server 210 (FIG. 2) may execute the remote BCE function 218 and may communicate with the local BCE function 216. The remote BCE function 218 may download recommended content to a cache folder, such as /usr/Y/.cache/mobileCDN/cache/Default. In an embodiment, the remote BCE function 218 may be granted super user privileges in order to perform multiple tasks. A first task may be to configure the cache folder as a shared folder in /etc/exports at the edge server 210 so it is accessible to all hosts under the sub-network of a small cell as read-only. A second task may be to set the permission for accessing content in the shared folder as read-only for all users.

The local BCE function 216 in the local cache 504 may be configured to mount the remote shared folder and merge index files. With respect to mounting the remote shared folder, the local BCE function 216 may be configured to add cache related parameters in a browser setting. In an embodiment, the local BCE function 216 may add parameters such as: enabling the cache extension, specifying the network file system protocol to be used for communication between the local BCE function 216 and the remote BCE function 218, specifying the remote shared folder, and specifying the local mount point. In an embodiment, the local BCE function 216 may use these parameters to mount the shared folder at the initialization phase of communication between the local BCE function 216 and the remote BCE function 218.

Referring now to FIG. 6, a diagram illustrating the merging of index files, previously described with reference to FIG. 4, is shown. A local BCE function 216 (FIG. 2) that is configured to merge index files may add the following parameters in a browser setting: update frequency and maximum number of remote files. The local BCE function 216 may read the remote index file from the shared folder at the update frequency and merge it with the local index file. The merging function may be implemented inside the local browser or as a standalone program.

For each entry in the remote index file, if its timestamp is newer than the timestamp in the entry with the same key in the local index file, it may replace the existing entry in the local index file. The entry file name may be a symbolic link at the local cache folder to a file in a remote shared cache folder. Using a symbolic link may make all cache files virtually stored locally in one cache folder. In an embodiment, there may be essentially no difference in directly using the file path and name in the remote shared cache folder.

Since the edge cache size of a small cell may be limited, the remote index file of the shared cache may be very small, which may add little reoccurring traffic to the network. If the timestamp of the index file is unchanged, no querying and merging of the index file may need to be performed. In addition, typical communications from a small cell eNode-B 202 to a mobile user device is not the bottleneck of the small cell network. Therefore, the traffic overhead may be negligible in the embodiments described herein.

A potential disadvantage to implementing the local BCE function 216 (FIG. 2) may be the complexity of browser dependent program development. For example, there may need to be one BCE program designed to operate with a first browser software and another BCE program designed to operate with a second browser software. In addition, it may not be possible to implement the BCE as a plug-in (i.e., an additional browser process/program) because it may need to be implemented in the browser kernel 502 (FIG. 2) for security reasons.

One approach may be to implement the local BCE function 216 as a standalone program outside of the browser software. The standalone local BCE function 216 may perform extension tasks in the browser, such as mounting the remote cache folder and merging index files. The program may need to understand the formats of index and data files of the browser cache file of each browser software it supports. However, this approach may violate browser security architecture for the browser software and, therefore, browser security may depend on third party software.

Caching may be a primary function for a browser to improve quality of user experience (QoE). Extending local caching to edge caching using the BCE function may further improve the QoE and potentially save bandwidth cost for end users. There may need to be incentives for browser vendors to support edge caching in case a mobile network operator offers the feature. On the other hand, a mobile network operator that offers edge caching may provide its own proprietary browser, or a specialized version of a commercially available browser, to their customers to support the browser cache extension.

The access control of the shared folder, in one embodiment, may depend on the NFS protocol. For example, an operating system may use a NFS that may not specify permission of a shared folder based on username, but it may specify permission of a shared folder based on the host name. Therefore, it may be important that the shared folder may only be exported as read-only. In an embodiment, only the mobile-CDN (remote) function on the edge server may have write privileges to the shared folder.

A problem for cache security may be the risk of cache contamination. If a web application uses content from other domains, it may need to ensure that the content is indeed from its original URL. A browser cache function may be a browser kernel program that stores only content from original URLs in the cache, and no web application may alter the cached content after it is stored. This may guarantee no cross-domain attacks caused by local cache contamination. If a URL is HTTPS, it may further guarantee no network attacks by edge cache contamination.

The same security measurement may be needed when the browser cache is extended by a BCE. A challenge may be guaranteeing that the cached contents are downloaded from the original URLs and cannot be altered by any programs after they are stored in the extended cache.

A trust relationship may be built between the local BCE function 216 and the remote BCE function 218 at the level of any of the following: content, edge server, or mobile-CDN 204.

With respect to owner signed content, the strictest guarantee for security may be to require the content owner's signature for any cached content in the edge cache 210 (FIG. 2). The local BCE function 216 may verify the integrity of content before actually using it. In an embodiment, no one except the content owner may alter the cached content regardless where the content is downloaded from. This approach may require the local browser to obtain a content signature if it is not inside the data file. Although very secure, this integrity verification process may be burdensome to a browser. If content fails the integrity check, the network bandwidth resource may be wasted.

With respect to a trusted peer program, if a local browser can trust the program that performs the remote BCE function 218, it may directly use cached content without content or index file integrity checks. For example, in a home cloud scenario, a browser on a tablet may use content in a cache folder on a PC as long as the tablet browser can make sure the content in that cache folder is only filled by a legitimate browser. In general, in a BCE system, the local BCE function 216 may need to trust that the remote BCE function 218 follows the browser security measurement on caching (i.e., content in the cache is from the original URL and no modification may be made during and/or after it is downloaded).

With respect to a trusted mobile-CDN 204, if a local browser can trust the mobile-CDN 204 and assumes that the remote BCE function 218 on edge servers 210 caches only original content, it may request that the mobile-CDN 204 sign the index file in the shared folder. Instead of verifying the integrity of each individual piece of content, a local browser may use the public key of the mobile-CDN 204 to verify the index file on the edge cache 210. Once the index file is verified, the local BCE function 216 may merge it to the local index file. This solution may be very lightweight with no additional content integrity checks.

The BCE parameters of the browser may further include an indicator to which content integrity check approach is to be used. If owner-signed content is selected, unless content on the share folder is signed by the content owner, the browser may not use it. If a trusted peer program is selected, the browser may need to verify the edge server using a safe program that fills the shared folder. If trusted mobile-CDN 204 is selected, the browser may need to verify the signature of the index file in the shared folder.

In conventional HTTPS architecture, cacheable content is usually only meant to be cacheable at the client browser. The proposed BCE may break this basic assumption. A content owner may not want anyone to share HTTPS content even if it is publically available to everyone. The biggest issue may be the risk of exposure of private information along with content, such as a cookie or a preference. In the embodiments described herein, this may be prevented from happening by enforcing the use of an HTTPS protocol to download content into the shared cache. Once stored in the shared cache, NFS may only be used by the local BCE function 216 to read a cached content from the shared cache. Without a personal login, a downloader at the edge server 210 may not get any personalized information.

A content owner may not want to use intermediate cache for accounting purposes because it may not want to lose statistics regarding accessing of its content. From this point of view, an intermediate edge server may not serve HTTPS content without the permission of the content owner because a cacheable parameter in the HTTPS header may assume only a browser cache. On the other hand, the content owner may actually want to benefit from edge caching for their HTTPS content. In this case, there may be a need to extend the HTTPS standard with additional parameters in the header for the content owner to explicitly mark content as being cacheable beyond the browser cache. For example, a REDISTRIBUTABLE parameter may enable an edge server to serve HTTPS content on behalf of the content server. In an embodiment, the content owner may request the redistributor to report the access statistics of the content.

The BCE may be used for both managed caching and transparent caching placements. The difference between the two may be based on who determines the content list to be fetched to the edge cache.

Figure 7:
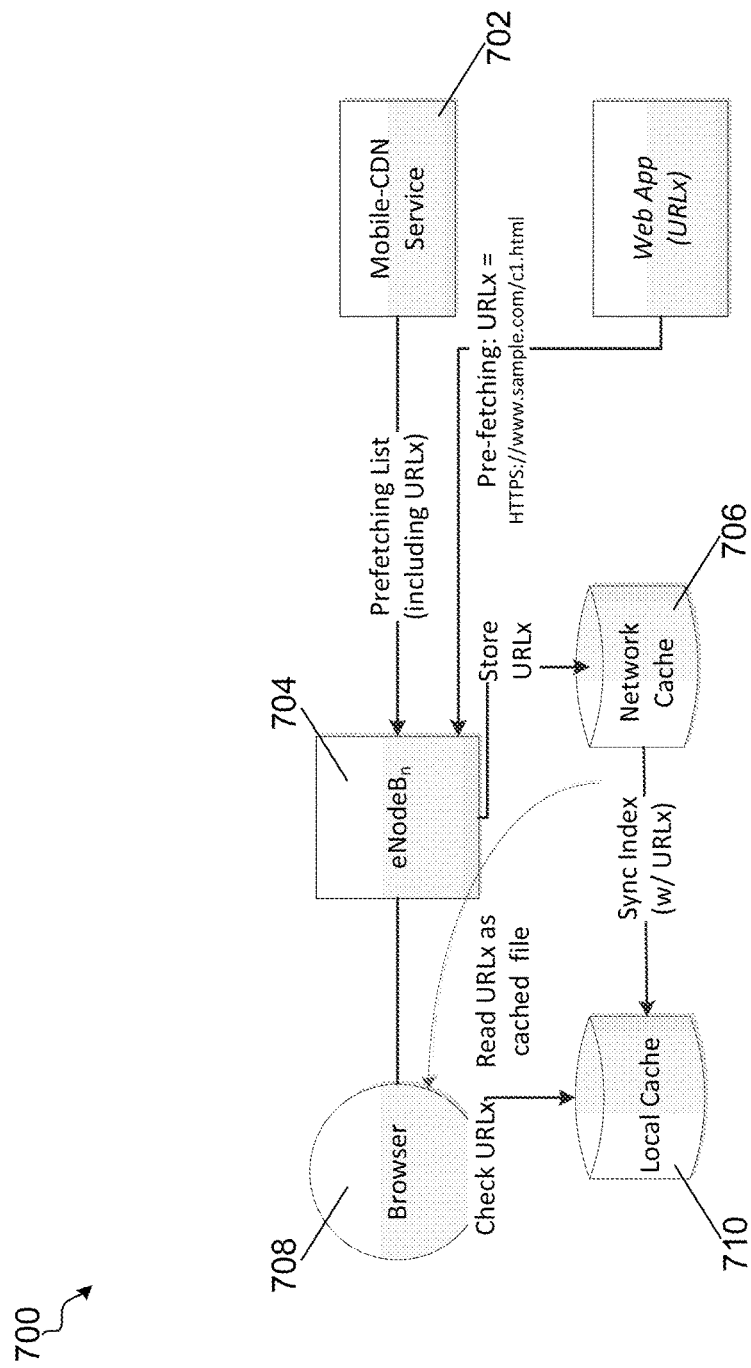
FIG. 7 is a diagram of a managed browser cache system.

Referring now to FIG. 7, a diagram of a managed browser cache system 700 is shown. Managed caching placement may let a mobile-CDN operator 702 decide a pre-fetching content list based on the statistics collected by the operator. The content on the list may be fetched to the cache at off-peak hours of mobile networks, for example, relieving the backhaul pressure of small cell networks.

In the example illustrated in FIG. 7, the mobile-CDN operator 702 may decide there is a list of content to be pre-fetched to a cache server of an eNode-B 704. The content may include, for example, HTTPS content with $URL_x$=https://www.sample.com/c1.html. The cache server of the eNode-B 704 may download URLx and store into it the network extension cache 706 of a local browser 708 that is accessible using BCE. An important function may be a program on the client machine that may dynamically update the cache index file of the local cache 710 to reflect changes to the network cache 706. This synchronization function may be implemented either inside the browser 708 or as a standalone process. If the browser 708 requests $URL_x$ later, it may first check the local cache index 710 and, if $URL_x$ exists, read the cache file via the file system protocol (e.g., Samba, NFS or sshfs) instead of the HTTPS protocol.

Figure 8:
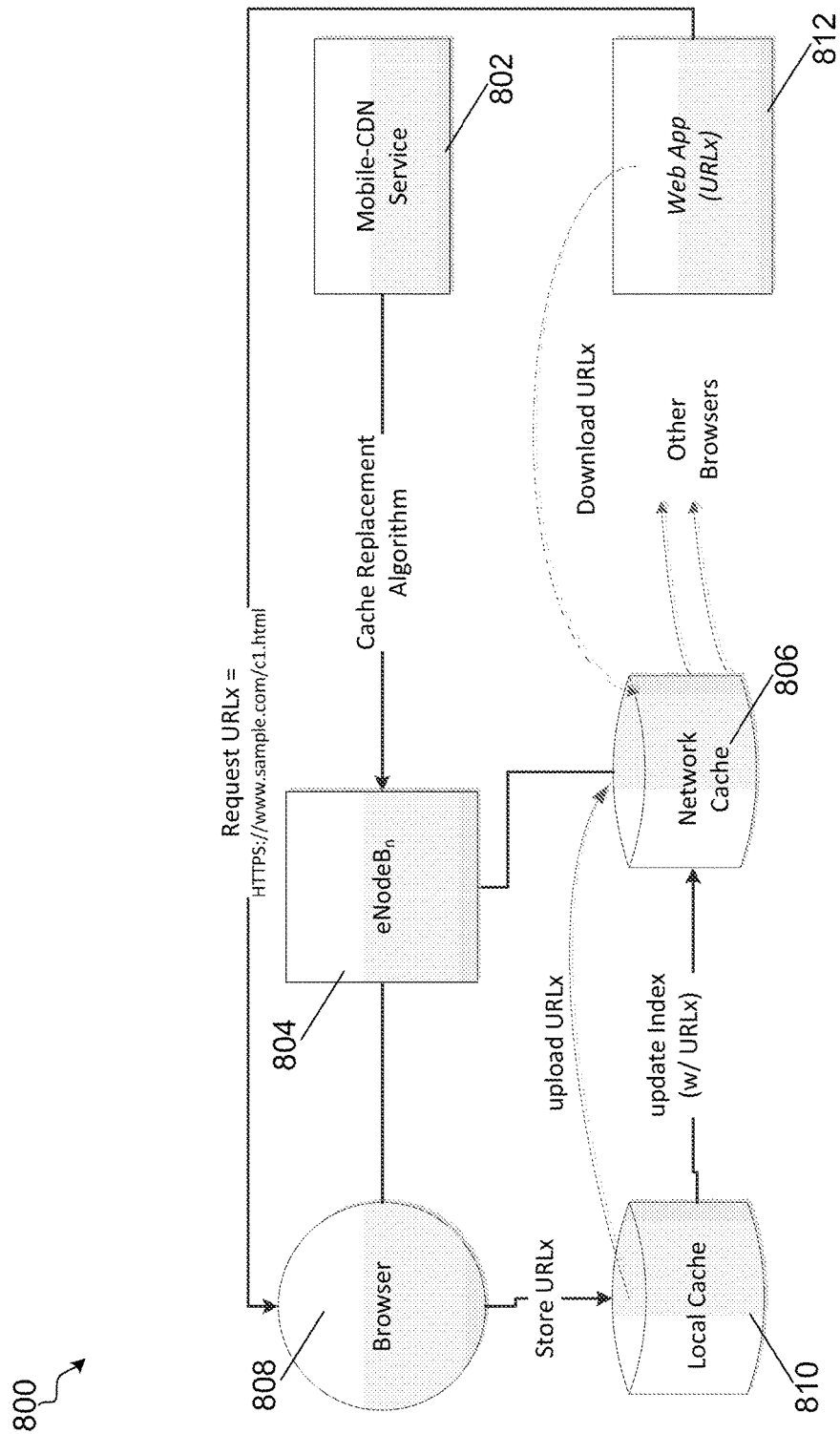
FIG. 8 is a diagram of a transparent browser cache system.

Referring now to FIG. 8, a diagram of a transparent browser cache system 800 is shown. Transparent caching placement may cache content in real-time as requests are made from users. Compared with managed caching placement, it may not take extra bandwidth to download any content not being requested, but it may not have the advantage off-peak hour capacity. Traditionally, transparent caching placement is implemented by an HTTP proxy server, which may intercept responses and store content data in responses while they are transported to the browser. For HTTPS content, the interception may not be possible unless the certificate of the content owner is delegated to the proxy server.

In an embodiment, when a browser 808 makes a request for content URLx, URLx may be stored in the browser's local cache 810. The local cache 810 may update its cache index to match a network cache 806. In an embodiment, the network cache 806 may obtain the cache index file of the local cache 810, when it decides what to cache based on a cache replacement algorithm given by a mobile-CDN service 802, content in the local cache 810 may be on its list. There may be two options for the network cache 806 to obtain the cached content at a browser 808. One may be from the original content owner 812, which may use backhaul bandwidth. The other may be from browser's 808 local cache 810, which may use the uplink bandwidth of the browser 808. The latter may be a transparent caching that caches content upon a user's request. The content may not be stored as it is downloaded from the original server, but it may be uploaded from the client that made the request. Once the content is in the network cache 806, other browsers under a same eNode-B 804 may retrieve it directly from the network cache 806.

Since the number of users in a small cell may be very little, the cache hit ratio of transparent caching placement may be much lower than the conventional CDN cache unless the users under a small cell have highly overlapped profiles.

Conventional CDN solutions for caching may be designed for large, powerful edge servers while a mobile-CDN may have a large number of small, less powerful edge servers located at each eNode-B. If BCE is implemented, edge caching may be accomplished simply as file transfers, using a NFS protocol, without the need for a proxy server. This may apply to both HTTP and HTTPS content. Since eNode-Bs may not need to run a web server and perform intercept of IP packets with deep packet inspection, the latency of HTTP responses may be reduced and, hence, the quality of user experience may be improved.

As described above, methods of edge catching for HTTPS content based on browser cache extension are described. The methods may be content owner agnostic and have no need for any form of right delegation from content owners to mobile-CDN and edge servers. The methods may eliminate the need to use a proxy server so that the complexity/load of eNode-Bs and the latency of HTTP/HTTPS requests/responses may be reduced. The method may be considered as a paradigm shift from the conventional proxy-driven CDN solution to a client-driven CDN solution, which may be different from peer-to-peer (P2P) communication that still uses HTTP between peers. Embodiments described herein may be particularly suitable for mobile-CDN with a large number of small cells where the eNode-Bs are lightweight, less securely deployed and serving less users and content.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of content delivery using a shared cache, the method comprising:
   receiving access to a read-only shared folder located in a remote cache of an edge server of a small cell network over a network file system (NFS) protocol, wherein the read-only shared folder comprises pre-fetched content retrieved from a content owner, and wherein the pre-fetched content is indicated to the edge server by a mobile-content distribution/delivery network (mobile-CDN) having a first interface with the edge server and a second interface with the content owner;
   mounting the read-only shared folder at a local browser cache of a user device using the NFS protocol;
   reading a remote index file from the read-only shared folder, wherein the remote index file comprises one or more remote entries indicating the pre-fetched content;
   merging the remote index file with a local index file in the local browser cache to create a merged index file, wherein the local index file comprises one or more local entries indicating local content;
   checking the merged index file for an entry corresponding to a HTTP/HTTPS request; and
   upon determining that content matching the HTTP/HTTPS request is present in the pre-fetched content in the remote cache, reading the requested content over the NFS protocol.

2. The method of claim 1, wherein the mounting the read-only shared folder comprises:
   enabling a cache extension in the local browser of the user device;
   specifying the NFS protocol;
   specifying the location of the read-only shared folder; and
   specifying a local mount point.

3. The method of claim 1, wherein the providing the merging the remote index file with the local index file comprises:
   creating one or more symbolic links in the local browser cache for each of the one or more remote entries in the remote index file; and adding the one or more symbolic links to the local index file.

4. The method of claim 1, wherein the reading the remote index file is performed at a configured update frequency.

5. The method of claim 1, wherein the merging the remote index file with the local index file comprises:
checking a timestamp of one or more remote entries in the remote index file;
comparing the timestamp of the one or more remote entries to a timestamp of one or more local entries in the local index file, wherein the one or more remote entries and the one or more local entries have corresponding keys; and
upon determining that the timestamp of the one or more remote entries is newer than the timestamp of the one or more local entries, replacing the one or more local entries with one or more symbolic links to the one or more remote entries.

6. The method of claim 1,
determining that the requested content is signed by the content owner prior to the using the requested content.

7. The method of claim 1, further comprising:
determining that the remote index file is signed by the mobile-CDN prior to the reading the requested content.

8. A device for receiving content using a shared cache, the device comprising:
a processor, operatively coupled to a transceiver, configured to receive access to a read-only shared folder in a remote cache of an edge server of a small cell network over a network file system (NFS) protocol, wherein the read-only shared folder comprises pre-fetched content retrieved from a content owner, and wherein the pre-fetched content is indicated to the edge server by a mobile-content distribution/delivery network (mobile-CDN) having a first interface with the edge server and a second interface with the content owner;
the processor further configured to mount the read-only shared folder at a local browser cache using the NFS protocol;
the processor further configured to read a remote index file from the read-only shared folder, wherein the remote index file comprises one or more remote entries indicating the pre-fetched content;
the processor further configured to merge the remote index file with a local index file in the local browser cache to create a merged index file, wherein the local index file comprises one or more local entries indicating local content;
the processor further configured to check the merged index file for an entry corresponding to a HTTP/HTTPS request; and
upon determining that content matching the HTTP/HTTPS request is present in the pre-fetched content in the remote cache, the processor further configured to read the requested content over the NFS protocol.

9. The device of claim 8, wherein the processor is further configured to determine that the requested content is signed by the content owner prior to using the requested content.

10. The device of claim 8, wherein the mounting the read-only shared folder comprises:
enabling a cache extension in the local browser of the user device;
specifying the NFS protocol;
specifying the location of the read-only shared folder; and
specifying a local mount point.

11. The device of claim 8, wherein the merging the remote index file with the local index file comprises:
creating one or more symbolic links in the local browser cache for each of the one or more remote entries in the remote index file; and
adding the one or more symbolic links to the local index file.

12. The device of claim 8, wherein the merging the remote index file with the local index file comprises:
checking a timestamp of the one or more remote entries in the remote index file;
comparing the timestamp of the one or more remote entries to a timestamp of one or more local entries in the local index file, wherein the one or more remote entries and the one or more local entries have corresponding keys; and
upon determining that the timestamp of the one or more remote entries is newer than the timestamp of the one or more local entries, replacing the one or more local entries with one or more symbolic links to the one or more remote entries.

13. The device of claim 8, wherein the reading the remote index file is performed at a configured update frequency.

14. The device of claim 8, wherein the processor is further configured to determine that the remote index file is signed by the mobile-CDN prior to using the requested content.

* * * * *